US011928778B2

(12) United States Patent
Li et al.

(10) Patent No.: US 11,928,778 B2
(45) Date of Patent: Mar. 12, 2024

(54) METHOD FOR HUMAN BODY MODEL RECONSTRUCTION AND RECONSTRUCTION SYSTEM

(71) Applicant: GUANGDONG OPPO MOBILE TELECOMMUNICATIONS CORP., LTD., Guangdong (CN)

(72) Inventors: Zhong Li, Palo Alto, CA (US); Yi Xu, Palo Alto, CA (US); Shuxue Quan, Palo Alto, CA (US)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 123 days.

(21) Appl. No.: 17/707,681

(22) Filed: Mar. 29, 2022

(65) Prior Publication Data
US 2022/0222895 A1 Jul. 14, 2022

Related U.S. Application Data

(63) Continuation of application No. PCT/CN2020/117916, filed on Sep. 25, 2020.
(Continued)

(51) Int. Cl.
*G06T 17/20* (2006.01)
*G06T 7/11* (2017.01)
*G06T 19/20* (2011.01)

(52) U.S. Cl.
CPC ............ *G06T 17/20* (2013.01); *G06T 7/11* (2017.01); *G06T 19/20* (2013.01); *G06T 2207/30201* (2013.01); *G06T 2219/2004* (2013.01)

(58) Field of Classification Search
CPC . G06T 17/20; G06T 7/11; G06T 19/20; G06T 2207/30201; G06T 2219/2004; G06T 15/04; G06T 17/00
See application file for complete search history.

(56) References Cited

U.S. PATENT DOCUMENTS 9,196,089 B2 * 11/2015 Tena ................. G06T 17/20
10,813,715 B1 * 10/2020 Chojnowski .......... G06F 3/0304
(Continued)

FOREIGN PATENT DOCUMENTS

CN 101082765 12/2007
CN 101404091 4/2009
(Continued)

OTHER PUBLICATIONS

Li et al., "3D Human Avatar Digitization from a Single Image," The 17th International Conference on Virtual-Reality Continuum and its Applications in Industry (VRCAI), 2019, No. 12.
(Continued)

*Primary Examiner* — Motilewa Good-Johnson
(74) *Attorney, Agent, or Firm* — Hodgson Russ LLP

(57) ABSTRACT

A method for human body model reconstruction and a reconstruction system are disclosed. The method includes acquiring a target image, and acquiring a segmented image by segmenting the target image based on an object to be reconstructed in the target image, the target image being one front image of the object; acquiring an initial estimate shape and a part of texture information of the object respectively, according to the segmented image; determining an initial 3D model of the object through the initial estimate shape, the initial 3D model being a 3D model without texture; acquiring complete texture information of the object according to the part of texture information and a texture generation model; and generating a 3D reconstruction model of the object based on the initial 3D model and the complete
(Continued)

texture information, the 3D reconstruction model being a 3D model with texture.

20 Claims, 9 Drawing Sheets

Related U.S. Application Data

(60) Provisional application No. 62/908,314, filed on Sep. 30, 2019.

(56) References Cited

U.S. PATENT DOCUMENTS

| | | | |
|---|---|---|---|
| 10,839,586 B1* | 11/2020 | Nemchinov | G06T 3/0037 |
| 2010/0097375 A1 | 4/2010 | Tadaishi et al. | |
| 2012/0218262 A1* | 8/2012 | Yomdin | G06T 13/40 |
| | | | 345/473 |
| 2013/0321413 A1 | 12/2013 | Sweeney et al. | |
| 2019/0357615 A1* | 11/2019 | Koh | G06T 17/10 |
| 2021/0012550 A1* | 1/2021 | Orvalho | G06T 17/00 |
| 2021/0049819 A1* | 2/2021 | Kim | G06T 19/006 |
| 2021/0118239 A1* | 4/2021 | Santesteban | G06N 3/044 |
| 2022/0076317 A1* | 3/2022 | Yang | G06T 7/13 |
| 2022/0108517 A1* | 4/2022 | Wang | G06T 15/506 |
| 2022/0262024 A1* | 8/2022 | Sun | G06T 17/00 |
| 2022/0358770 A1* | 11/2022 | Guler | G06T 7/50 |

FOREIGN PATENT DOCUMENTS

| | | | | |
|---|---|---|---|---|
| CN | 109191554 | | 1/2019 | |
| CN | 109840939 | | 6/2019 | |
| CN | 110189408 | | 8/2019 | |
| CN | 110223370 | | 9/2019 | |
| CN | 110298916 | | 10/2019 | |
| CN | 109636831 B | * | 8/2023 | ............ G06T 17/00 |
| JP | 2016209399 A | * | 12/2016 | |

OTHER PUBLICATIONS

Alldieck et al., "Learning to Reconstruct People in Clothing from a Single RGB Camera," IEEE/CVF Conference on Computer Vision and Pattern Recognition (CVPR), 2019.

WIPO, International Search Report and Written Opinion for PCT/CN2020/117916, dated Dec. 25, 2020.

Weng et al., "Photo Wake-Up: 3D Character Animation From a Single Photo," 2019 IEEE/CVF Conference on Computer Vision and Pattern Recognition (CVPR), 2019.

Natsume et al., "SiCloPe: Silhouette-Based Clothed People," IEEE/CVF Conference on Computer Vision and Pattern Recognition (CVPR), 2019.

EPO, Extended European Search Report for EP Application No. 20873287.5, dated Jan. 10, 2023.

* cited by examiner

Input image

Reconstruction geometry

Front texture

Back texture

METHOD FOR HUMAN BODY MODEL RECONSTRUCTION AND RECONSTRUCTION SYSTEM

CROSS-REFERENCE TO RELATED APPLICATIONS

The present application is a continuation of International Patent Application No. PCT/CN2020/117916, filed Sep. 25, 2020, which claims priority to U.S. Patent Application No. 62/908,314, filed Sep. 30, 2019, the entire disclosures of which are incorporated herein by reference.

TECHNICAL FIELD

The present disclosure relates to the field of computer vision and 3D human-body reconstruction, in particular to a method for human-body model reconstruction, a reconstruction system, and a non-transitory computer-readable storage medium.

BACKGROUND

High-accuracy human-body reconstruction is an important problem in fields like computer vision and computational geometry, which intends to quickly and accurately reconstruct a 3D human-body parametric model from a human-body image. Such technology may be widely applied in many fields like action analysis, visual effects, virtual reality, E-commerce, and has high research and commercial value.

When a human body is reconstructed, a complicated apparatus and a complicated reconstruction algorithm are normally applied, but such method cannot be applied in daily scenarios. Although a reconstruction of a model may be performed using only one frame of image, an accuracy of a 3D model acquired from the reconstruction is poor, and not all texture information of the human body can be constructed.

Therefore, with the current reconstruction method of a model, a 3D human-body model with a high accuracy and all texture information cannot be acquired through a simple reconstruction process.

SUMMARY OF THE DISCLOSURE

According to one aspect of the present disclosure, a method for human body model reconstruction is provided, including acquiring a target image, and acquiring a segmented image by segmenting the target image based on an object to be reconstructed in the target image, the target image being one front image of the object; acquiring an initial estimate shape and a part of texture information of the object respectively, according to the segmented image; determining an initial 3D model of the object through the initial estimate shape, the initial 3D model being a 3D model without texture; acquiring complete texture information of the object according to the part of texture information and a texture generation model; and generating a 3D reconstruction model of the object based on the initial 3D model and the complete texture information, the 3D reconstruction model being a 3D model with texture.

According to another aspect of the present disclosure, A reconstruction system is provided, wherein the reconstruction system includes a processor and a memory storing instructions executable by the processor, and when the instructions are executed by the processor, causing the processor to perform: acquiring one front image of an object to be reconstructed and acquiring a segmented image by segmenting the one front image based on the object in the one front image; acquiring an initial estimate shape and front texture information of the object respectively, according to the segmented image; determining an initial 3D model of the object through the initial estimate shape, the initial 3D model being a 3D model without texture; acquiring complete texture information of the object according to the front texture information and a texture generation model; and generating a 3D reconstruction model of the object based on the initial 3D model and the complete texture information, the 3D reconstruction model being a 3D model with texture.

According to yet another aspect of the present disclosure, A non-transitory computer-readable storage medium is provided, wherein the computer-readable storage medium stores a program, when the program is executed, causing a processor to perform: acquiring one front image of an object to be reconstructed and acquiring a segmented image by segmenting the one front image based on the object in the one front image; acquiring an initial estimate shape and front texture information of the object respectively, according to the segmented image; determining an initial 3D model of the object through the initial estimate shape, the initial 3D model being a 3D model without texture; acquiring complete texture information of the object according to the front texture information and a texture generation model; and generating a 3D reconstruction model of the object based on the initial 3D model and the complete texture information, the 3D reconstruction model being a 3D model with texture.

DETAILED DESCRIPTION

Figure 1:
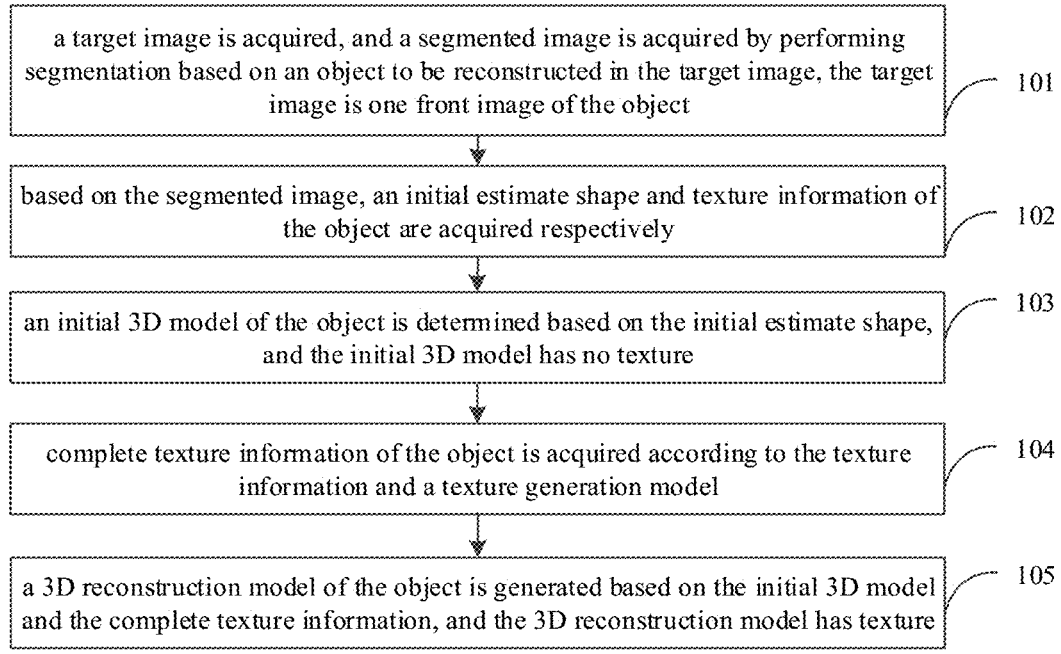
FIG. 1 is a first schematic flow chart of a method for human body model reconstruction.

The present disclosure will be described clearly and thoroughly herein by referring to the accompanying drawings of the embodiments. Understandably, the embodiments described herein are only a part of the embodiments of the present disclosure, and are not to limit the present disclosure. In addition, it should be noted that, for the purpose of description, accompanying drawings only show some parts that are relevant to the present disclosure.

High-accuracy human-body reconstruction is an important problem in fields like computer vision and computational geometry, which intends to quickly and accurately reconstruct a 3D human-body parametric model from a human-body image. Such technology may be widely applied in many fields like action analysis, visual effects, virtual reality, E-commerce, and has high research and commercial value.

With development of stereo vision technology and gradual popularization of VR (Virtual Reality) and AR (Augmented Reality), how to acquire a real 3D model of a human body from real life has become a hot spot and a difficulty of study, in particular to capturing human body movements in a dynamic scene, and thus, the real 3D model of the human body can be applied in digital animation, capturing of movie-quality character action effects, and teleconference etc.

Real-time 3D human body reconstruction mainly includes two aspects: geometry optimization and texture affixation. The geometry optimization is a process of accurately forming a 3D model of a human body. The process determines a geometric topology structure of the model, shows relatively accurate geometric information, but loses all texture information of a optimized target. Texture mapping is a process of mapping a texture pixel to a surface of 3D object. By texturing mapping, texture information of the model can be recovered, and a sense of reality of the model can be enhanced. Therefore, when a vivid human body representation is reconstructed, high-quality texture mapping plays an important role.

In early days, Kanade and Narayanan used a dome with a diameter of 5 meters, and mounted 51 cameras onto the dome to digitize a real object to FVV (Free Viewpoint Video). Recent capturing setups tend to use industry-level synchronized cameras with higher resolution and speed. For example, the CMU Panoptic studio consists of 480 VGA (Video Graphics Array) cameras, 31 HD cameras, and 10 Kinect sensors to reconstruct and recover multiple human activities. It can be seen that, a realization of the above 3D human body reconstruction technologies is greatly relied on huge 3D capturing systems and complicated reconstruction algorithm. It is unpractical to use such complicated setup in everyday scenarios.

Some studies may recover a pose and an approximate shape of the human body from one or a few photos, but such reconstruction methods have a relatively low accuracy. A human body from a video clip can be reconstructed by using a non-rigid body deformation method, but the method requires a pre-captured template. In recent learning-based methods, a CNN (Convolutional Neural Network) is used to achieve high-resolution results by training with a large number of synthetic images. However, problems, for example, a problem that a 3D model reconstruction result mismatches with a 2-D image, still exist, and due to bias in training data, the methods do not apply to all types of input.

Besides, when the above methods are used, since only one image is used as input, even full human body is reconstructed, it just has only part of texture information, and complete texture information cannot be reconstructed. Natusme et al. use a lot of synthetic pictures to train a model to infer occluded colors, however, the resulting color lacks photorealism.

In other words, when a 3D model of a human body is reconstructed currently, if one image is used, the 3D model with high accuracy cannot be acquired, i.e. the reconstruction accuracy is low, and after the 3D model is reconstructed, complete texture information of the human body cannot be recovered, i.e. a reconstruction effect is poor.

To address the challenges of the current technology, in the embodiments of the present disclosure, after one frame of target image is acquired by a reconstruction system, a segmented image corresponding to the object is acquired by a segmentation process. Based on the segmented image, on one hand, the reconstruction system, on a basis of acquiring an initial estimate shape, generates an initial 3D model corresponding to the object and without human body texture. On the other hand, the reconstruction system, by a part of texture information extracted from the segmented image, uses the texture to generate a model, and recovers complete texture information of the object. Finally, a 3D reconstruction model with texture is acquired by a mapping between the initial 3D model and the complete texture information. It can be seen that, the human body model reconstruction method provided by the present disclosure, can use one frame of image to accurately reconstruct a 3D model of a human body, and meanwhile, complete texture information of the human body can be recovered. Thereby, an accuracy of a model reconstruction is improved and an effect of the model reconstruction is greatly optimized.

Specifically, in the present disclosure, based on an inputted single frame of a front image of the human body, the reconstruction system can reconstruct the 3D model of the human body and complete texture information. Firstly, the reconstruction system can segment an inputted single frame of image, and then a SMPL (Skinned Multi-Person Linear Model) model is fitted to the segmented image. Since the SMPL model does not fit well to the human body silhouette in the image, the reconstruction system can further deform the SMPL model in the present disclosure. The reconstruction system can realize the deformation of the model by finding corresponding relationships between the silhouette of the fitted SMPL model and the human body silhouette, and correct a depth image of the SMPL model to a final shape, i.e. a front model of the human body is acquired. Then, the reconstruction system can reconstruct a back model of the human body with the same method. The front model and the back model can then be stitched together to acquire the initial 3D model of the human body, but the initial 3D model cannot show all texture information of the human body. To recover an invisible texture of the back of the human body, the reconstruction system in the present disclosure can use a texture generation model, i.e. an Infer-GAN network, to recover other invisible texture information based on the part of texture information of the human body that can be seen, and complete texture information of the human body can be constructed at last. Finally, with initial 3D information of the human body and all texture information, the reconstruction system can acquire the 3D reconstruction model containing complete texture information of the human body. Thus, the human body model reconstruction is achieved based on one frame of input image, and the human body model reconstruction can specifically include a 3D human body construction and a texture reconstruction.

A method for human body model reconstruction is provided, including acquiring a target image, and acquiring a segmented image by segmenting the target image based on an object to be reconstruct in the target image, the target image being one front image of the object; acquiring an initial estimate shape and a part of texture information of the object respectively, according to the segmented image; determining an initial 3D model of the object through the initial estimate shape, the initial 3D model being a 3D model without texture; acquiring complete texture information of the object according to the part of texture information and a texture generation model; and generating a 3D reconstruction model of the object based on the initial 3D model and the complete texture information, the 3D reconstruction model being a 3D model with texture.

In some embodiments, the acquiring an initial estimate shape and a part of texture information of the object respectively, according to the segmented image includes fitting the segmented image to a SMPL model, and acquiring the initial estimate shape; and extracting pixel information of the segmented image, and acquiring the part of texture information.

In some embodiments, the determining an initial 3D model of the object through the initial estimate shape includes acquiring a first silhouette of the object; correcting the initial estimate shape according to the first silhouette, and generating a front model and a back model of the object; and stitching the front model and the back model, and generating the initial 3D model.

In some embodiments, the correcting the initial estimate shape according to the first silhouette, and generating a front model of the object includes determining a second silhouette of the initial estimate shape; determining a first mapping relationship between the first silhouette and the second silhouette; generating a first warping function based on the first mapping relationship; and generating the front model through the first warping function.

In some embodiments, after the generating the front model through the first warping function, the method further includes fixing a face geometry of the front model.

In some embodiments, the correcting the initial estimate shape according to the first silhouette, and generating a back model of the object includes rendering the initial estimate shape and acquiring a back estimate shape of the object; determining a third silhouette of the back estimate shape; determining a second mapping relationship between the first silhouette and the third silhouette; generating a second warping function based on the second mapping relationship; and generating the back model through the second warping function.

In some embodiments, before acquiring complete texture information of the object according to the part of texture information and a texture generation model, the method further includes acquiring a training dataset, the training dataset including a plurality of sets of texture data, and each of the sets of texture data including a first texture image and a second texture image collected from a same object at different angles; and training the texture generation model through the training dataset.

In some embodiments, the training the texture generation model through the training dataset includes determining a first contour corresponding to the first texture image, and determining a second contour corresponding to the second texture image; and training the texture generation model through the first texture image, the first contour, the second texture image, and the second contour.

In some embodiments, the acquiring complete texture information of the object according to the part of texture information and a texture generation model includes inputting the part of texture information to the texture generation model and outputting other part of texture information of the object; and acquiring the complete texture information based on the part of texture information and the other part of texture information.

In some embodiments, after the generating a 3D reconstruction model of the object based on the initial 3D model and the complete texture information, the method further includes animating the 3D reconstruction model through an animation reconstruction model.

In some embodiments, the target image is one frame of an RGB image.

A reconstruction system is provided, wherein the reconstruction system includes a processor and a memory storing instructions executable by the processor, and when the instructions are executed by the processor, causing the processor to perform: acquiring one front image of an object to be reconstructed and acquiring a segmented image by segmenting the one front image based on the object in the one front image; acquiring an initial estimate shape and front texture information of the object respectively, according to the segmented image; determining an initial 3D model of the object through the initial estimate shape, the initial 3D model being a 3D model without texture; acquiring complete texture information of the object according to the front texture information and a texture generation model; and generating a 3D reconstruction model of the object based on the initial 3D model and the complete texture information, the 3D reconstruction model being a 3D model with texture.

In some embodiments, the initial estimate shape is acquired by fitting the segmented image to a SMPL model; and the front texture information is acquired by extracting pixel information of the segmented image.

In some embodiments, the determining an initial 3D model of the object through the initial estimate shape includes acquiring a first silhouette of the object; correcting the initial estimate shape according to the first silhouette, and generating a front model and a back model of the object; and stitching on the front model and the back model, and generating the initial 3D model.

In some embodiments, the correcting the initial estimate shape according to the first silhouette, and generating a front model of the object includes determining a second silhouette of the initial estimate shape; determining a first mapping relationship between the first silhouette and the second silhouette; generating a first warping function based on the first mapping relationship; and generating the front model through the first warping function.

In some embodiments, the correcting the initial estimate shape according to the first silhouette, and generating a back model of the object includes: rendering the initial estimate shape and acquiring a back estimate shape of the object; determining a third silhouette of the back estimate shape; determining a second mapping relationship between the first silhouette and the third silhouette; generating a second warping function based on the second mapping relationship; and generating the back model through the second warping function.

In some embodiments, the texture generation model is trained through a training dataset, the training dataset including a plurality of sets of texture data, and each of the sets of texture data including a first texture image and a second texture image collected from a same object at different angles.

In some embodiments, the texture generation model is trained through the first texture image, a first contour corresponding to the first texture image, the second texture image, and a second contour corresponding to the second texture image the training dataset.

In some embodiments, the complete texture information of the object includes the front texture information and back texture information, the back texture information is predicted from the front texture information through the texture generation model.

A non-transitory computer-readable storage medium is provided, wherein the computer-readable storage medium stores a program, when the program is executed, causing a processor to perform: acquiring one front image of an object to be reconstructed and acquiring a segmented image by segmenting the one front image based on the object in the one front image; acquiring an initial estimate shape and front texture information of the object respectively, according to the segmented image; determining an initial 3D model of the object through the initial estimate shape, the initial 3D model being a 3D model without texture; acquiring complete texture information of the object according to the front texture information and a texture generation model; and generating a 3D reconstruction model of the object based on the initial 3D model and the complete texture information, the 3D reconstruction model being a 3D model with texture.

The present disclosure will be described clearly and thoroughly herein by referring to the accompanying drawings of the embodiments.

A method for human body model reconstruction is provided by an embodiment of the present disclosure. FIG. 1 is a first schematic flow chart of a method for human body model reconstruction. As shown in FIG. 1, in embodiments of the present disclosure, the method for a reconstruction system to reconstruct a 3D human body includes the following operations.

In operation 101, a target image is acquired, and a segmented image is acquired by performing segmentation based on an object to be reconstructed of the target image, the target image is one front image of the object.

In embodiments of the present disclosure, the reconstruction system can first acquire the target image, then perform segmentation based on the object of the target image, and then acquire the segmented image. That is, the segmented image is acquired by segmenting the target image based on an object to be reconstructed in the target image.

Furthermore, in embodiments of the present disclosure, the reconstruction system can include at least one terminal, or a terminal and a server. Specifically, a processing flow of the reconstruction method for the 3D model and texture information provided by the present disclosure can be realized in the terminal, can also be realized in the server, or can also be realized in both the terminal and the server.

Figure 2:
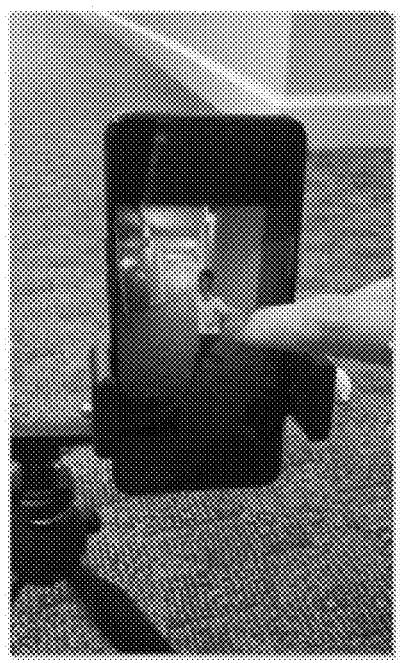
FIG. 2 is a first schematic diagram of an AR/VR application demo.
Figure 3:
FIG. 3 is a second schematic diagram of the AR/VR application demo.
Figure 4:
FIG. 4 is a third schematic diagram of the AR/VR application demo.

Exemplarily, the reconstruction system can build an application of the terminal. When the terminal runs the application, an image for a human body is captured by a configured capturing device. Then the image is sent to a remote server to perform a reconstruction process of a 3D model and texture information. Next, after a generated 3D reconstruction model is received by the terminal, an animation sequence can be rendered and replayed in the terminal. FIG. 2 is a first schematic diagram of an AR/VR application demo. FIG. 3 is a second schematic diagram of the AR/VR application demo. FIG. 4 is a third schematic diagram of the AR/VR application demo. As shown in FIGS. 2, 3, and 4, in the present disclosure, the terminal can use ARCore to generate a virtual model, i.e. the 3D reconstruction model is placed in a real scene, to acquire a video of a dynamic model. FIG. 2 and FIG. 3 show two animated models rendered in a real environment. FIG. 4 uses ARCore demo, and the animated model can be viewed from different angles.

It should be noted that, in embodiments of the present disclosure, the above described terminal can be any terminal with functions of capturing and storing, such as a pad, a mobile phone, an electronic reader, a remote, a PC (Personal Computer), a lap top computer, a vehicle mounted device, a network television, a wearable device, a PDA (Personal Digital Assistant), a PMP (Portable Media Player), a navigation device.

Furthermore, in embodiments of the present disclosure, the target image can be one RGB image. Specifically, the target image can be one frame of front image of the object. The object is the human body in the target image.

It can be understood that, in embodiments of the present disclosure, the reconstruction system can acquire the target image in many ways. For example, the reconstruction system can accept a target image sent from another device, can also acquire an image of an object to be reconstructed by a configured capturing device to acquire a target image, can also download a target image by accessing a website, or can also read a target image from a storage address.

Furthermore, in embodiments of the present disclosure, when the reconstruction system is performing a segmentation process, the object can be segmented out from the target image on a basis of the object. Specifically, after the segmentation process is performed on the target image by the reconstruction system, an area with the object and another area without the object can be acquired. The reconstruction system can determine a part of image with the object as the segmented image, and another part of image without the object is determined as another image.

That is to say, in the present disclosure, a segmented image is an image of the object, which is segmented from the target image.

It can be understood that, in embodiments of the present disclosure, the reconstruction system can perform segmentation on the target image in many ways. For example, the reconstruction system can acquire the segmented image by human body clothing segmentation method.

In operation 102, based on the segmented image, an initial estimate shape and texture information of the object are acquired respectively.

In embodiments of the present disclosure, after the reconstruction system acquires the target image and acquires the segmented image by performing segmentation based on the object of the target image, the initial estimate model of the object can be acquired based on the segmented image, and texture information of the object can be acquired. The texture information acquired by the reconstruction system is a part of texture information of the object.

It should be noted that, in embodiments of the present disclosure, after the reconstruction system acquires the segmented image through the segmentation process, a pose can be fitted to a shape of the object, and thus the initial estimate shape can be acquired.

Furthermore, in the present disclosure, normally, the pose of the human body is unclear for the object of the segmented image. Therefore, a parametric model of the human body shape can be relied on. For example, a SMPL model or a SCAPE (Shape Completion and Animation of People) is used to fit the pose to the object of the segmented image.

The SMPL model is a parameterized human body model, which is a human body construction method proposed by Matthew Loper. The method can perform any human body construction model and animation drive. The method proposes a manner for human body surface morphology in human body pose images. Such manner can simulate projections and depressions of human muscles during limb movements. Therefore, it can avoid the surface distortion of the human body during movement, and can accurately portray shapes during human muscle stretching and contraction movement.

In the method of constructing the human body model using SMPL model, β and θ are input parameters thereof β represents 10 parameters of human body height, fatness, head-to-body ratio, etc., and θ represents 75 parameters of overall human motion pose and relative angles of 24 joints. The SCAPE model uses a deformation matrix to portray a diversity resulted from changes in the body itself.

Exemplarily, in the present disclosure, when the reconstruction system generates the initial estimate shape of the object based on the segmented image, the SMPL model can be used to be fitted to the segmented image, and the initial estimate shape is acquired. The acquired initial estimate shape can include a pose parameter, a shape parameter, and an error parameter.

It can be understood that, in embodiments of the present disclosure, when the reconstruction system acquires texture information of the object, pixel information can be extracted from the segmented image. Thus, corresponding texture information can be determined using the pixel information of the object.

That is to say, in the present disclosure, when the reconstruction system acquires a part of texture information of the object based on the segmented image, pixel information of the segmented image is extracted to acquire the part of texture information. The part of texture information can represent front texture of the object. Specifically, since the target image is the front image of the object, the segmented image is a front area of the object. Then, after the pixel extraction, only front texture of the object can be acquired, and texture of the back cannot be seen.

In operation 103, an initial 3D model of the object is determined based on the initial estimate shape, and the initial 3D model has no texture.

In embodiments of the present disclosure, after the reconstruction system acquires the initial estimate shape of the object based on the segmented image, the 3D model of the object can be reconstructed on a basis of the initial estimate shape. Thus, the initial 3D model of the object without texture information can be acquired.

It should be noted that, in embodiments of the present disclosure, the initial 3D model is reconstructed by the reconstruction system based on the initial estimate shape of the object, which is only reconstructed on a basis of a pose and a contour of the object, without texture like skin and cloth of the object. Therefore, the initial 3D model is a 3D model without texture.

It can be understood that, in embodiments of the present disclosure, although the parametric model fitting method acquires the shape and the pose of the object, they are not completely matched with a real body silhouette of the object. That is to say, the initial estimate shape cannot accurately match with the real silhouette of the object. Therefore, the reconstruction system needs to firstly correct the initial estimate shape and then reconstruct the initial 3D model.

Furthermore, in embodiments of the present disclosure, when the reconstruction system determines the initial 3D model of the object based on the initial estimate shape, a first silhouette of the object can be acquired first, and then, the initial estimate shape is corrected according to the first silhouette. Thus, a front model and a back model of the object can be generated respectively. Finally, the reconstruction system generates the initial 3D model of the object by stitching the front model and the back model.

Exemplarily, in embodiments of the present disclosure, when the reconstruction system performs correction according to the first silhouette and the initial estimate shape to generate the front model of the object, a second silhouette of the initial estimate shape can be determined firstly. Then, a first mapping relationship between the first silhouette and the second silhouette can be determined. Then, a first warping function can be generated based on the first mapping relationship. Finally, the front model can be generated by the first warping function.

It should be noted that, in embodiments of the present disclosure, after the reconstruction system generates the front model by the first warping function, since the prediction of the head pose is inaccurate, a face of the object may be deformed. Therefore, after the reconstruction system generates the front model, the face geometry of the front model of the object needs to be fixed, to fix the deformed face.

Furthermore, in embodiments of the present disclosure, after the reconstruction system generates the front model of the object, the back model of the object can be recovered and reconstructed. Specifically, the reconstruction system can adopt a method similar to that of generating the front model, to reconstruct the back model of the object.

It should be noted that, in embodiments of the present disclosure, the initial estimate shape is acquired by fitting the segmented image of the front image of the object. Therefore, the initial estimate shape is a front shape of the object. The reconstruction system cannot directly use the initial estimate shape to acquire the back model of the object, and a back shape of the object needs to be determined first based on the initial estimate shape.

Exemplarily, in embodiments of the present disclosure, when the reconstruction system performs correction according to the first silhouette and the initial estimate shape to generate the back model of the object, the initial estimate shape can be rendered first to acquire a back estimate shape of the object. Then, a third silhouette of the back estimate shape is determined; and a second mapping relationship between the first silhouette and the third silhouette is determined. Next, a second warping function can be generated based on the second mapping relationship. Finally, the back model is generated through the second warping function.

Specifically, in embodiments of the present disclosure, when the reconstruction system determines the first mapping relationship and the second mapping relationship, a 2-D non-rigid registration is adopted to correspond the first silhouette to the second silhouette and correspond the first silhouette to the third silhouette respectively.

Furthermore, in embodiments of the present disclosure, before the reconstruction system generates the back model, a back-face culling technique is adopted to render and acquire the back estimate shape of the object.

In operation 104: complete texture information of the object is acquired according to the texture information and a texture generation model.

In embodiments of the present disclosure, after the reconstruction system acquires the texture information of the object based on the segmented image, the complete texture information of the object is acquired according to the texture information and the pre-trained texture generation model.

It should be noted that, in embodiments of the present disclosure, since firstly-generated texture information is determined from front texture of the object, in order to acquire a 3D model of the object with texture information, the reconstruction system needs to generate the complete texture information of the object first.

Furthermore, in embodiments of the present disclosure, the reconstruction system can first build a texture generation model that is used to predict texture information. Then, the texture generation model is used, and other part of texture information of the object is predicted and generated based on the texture information of the object. Finally, complete texture information of the object can be acquired.

Exemplarily, in embodiments of the present disclosure, the texture generation model can be acquired by GAN (Generative Adversarial Networks), e.g. InferGAN.

It should be noted that, in embodiments of the present disclosure, before the reconstruction system acquires the complete texture information of the object according to the texture information and the texture generation model. A training dataset can be acquired first. Then, the training dataset can be used to perform model training. Finally, the texture generation model is completed to be built.

It should be understood that, in embodiments of the present disclosure, the training dataset can include multiple sets of texture data. Each set of texture data can include different texture images collected from a same object at different angles, i.e. a first texture image and a second texture image.

Specifically, in the present disclosure, since the first texture image and the second texture image are captured at different angles, the texture information of the first texture image and the texture information of the second texture image are different.

Furthermore, in embodiments of the present disclosure, when the reconstruction system uses the training dataset to train a model to generate the texture generation model, the first contour corresponding to the first texture image can be determined, and the second contour corresponding to the second texture image can be determined. Then, the texture generation model can be trained through the first texture image, the first contour, the second texture image, and the second contour.

It should be noted that, in the present disclosure, the training of the texture generation model does not require a training dataset with strictly-matched positive and negative colors. That is, the reconstruction system can train the texture generation model with any set of pictures of the same person captured at different angles.

It should be noted that, in embodiments of the present disclosure, when the reconstruction system acquires the complete texture information of the object according to the texture information and the texture generation model, the texture information can be first inputted into the texture generation model, and predicted texture information corresponding to the object can be outputted. Then, the complete texture information can be acquired based on the texture information and the predicted texture information.

It should be understood that, in embodiments of the present disclosure, the predicted texture information can be other texture information of the object, other than the part of texture information. That is, the reconstruction system acquires the predicted texture information through the texture generation model, and the predicted texture information is the other texture information that cannot be acquired from the segmented image, such as the back texture of the object.

Furthermore, in embodiments of the present disclosure, since the predicted texture information is other part of texture information other than the part of texture information, when the reconstruction system combines the part of texture information and the predicted texture information, the complete texture information of the object can be generated.

In operation 105, a 3D reconstruction model of the object is generated based on the initial 3D model and the complete texture information.

In embodiments of the present disclosure, after the reconstruction system determines the initial 3D model of the object through the initial estimate shape, and acquires the complete texture information of the object according to the part of texture information and the texture generation model, the 3D reconstruction model of the object with texture information is further generated by the initial 3D model and the complete texture information.

Figure 5:
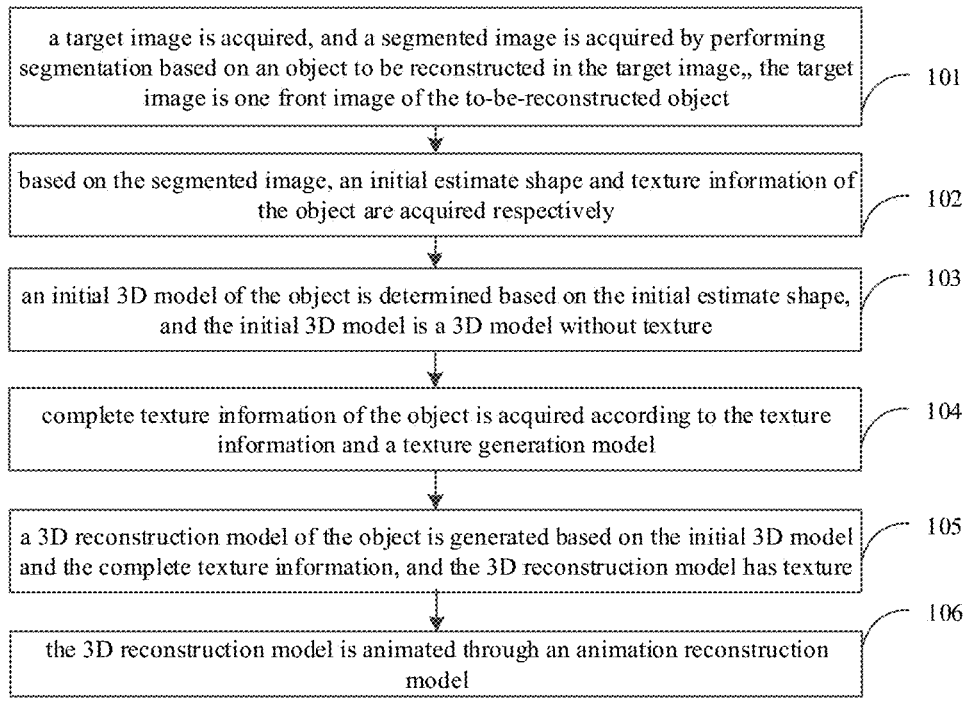
FIG. 5 is a second schematic flow chart of a method for human body model reconstruction.

Furthermore, in embodiments of the present disclosure, FIG. 5 is a second schematic flow chart of the method for human body model reconstruction. As shown in FIG. 5, after the 3D reconstruction model of the object is generated based on the initial 3D model and the complete texture information, i.e. after the operation 105, the method for human body model reconstruction performed by the reconstruction system can include the following operations.

In operation 106, the 3D reconstruction model is animated through an animation reconstruction model.

In embodiments of the present disclosure, after the reconstruction system completes the generation of the 3D reconstruction model of the object, an animation effect can be added to the object through the pretrained animation reconstruction model. Specifically, the reconstruction system can use the animation reconstruction model to perform animating process on the 3D reconstruction model.

It should be noted that, in the present disclosure, the reconstruction system uses linear blend skinning to animate the reconstruction model. A skinning weight of SMPL is transferred to the reconstructed 3D reconstruction model and the animating process is performed on the reconstructed 3D reconstruction model with existing motion capture data.

Through the above described operations 101 to 111 in the method for human body model reconstruction, the reconstruction system can take one RGB image as input, and simultaneously reconstruct a 3D human body shape and a full-body texture image. Specifically, the reconstruction system can first perform segmentation process on the human-body shape part in the image, then fit the segmented image to the parametric model to acquire the initial estimate shape of the human body shape. Next, the reconstruction system can perform correction on the initial estimate shape using a dense correspondence based on the silhouette to acquire and stitch the front model and the back model, and thus the initial 3D model is acquired. Furthermore, in order to predict the invisible back texture from the front image, the reconstruction system can use the pretrained texture generation model to recover the invisible texture information, and thus full texture of the human body is generated. Finally, the reconstruction system can use the initial 3D model and the full texture to construct the 3D reconstruction model with texture information.

Specifically, the method for human body model reconstruction provided by the embodiment of the present disclosure, adopts a 2-D non-rigid deformation algorithm to correct the initial estimate shape, and acquires a final reconstruction result. Meanwhile, the reconstruction system trains the texture generation model that can recover texture information, such as the InferGAN, and thus the prediction and deduction of the invisible texture are realized. Furthermore, the reconstruction system provided by the present disclosure, only uses one input image to reconstruct a human body 3D model with complete texture information.

Figure 6:
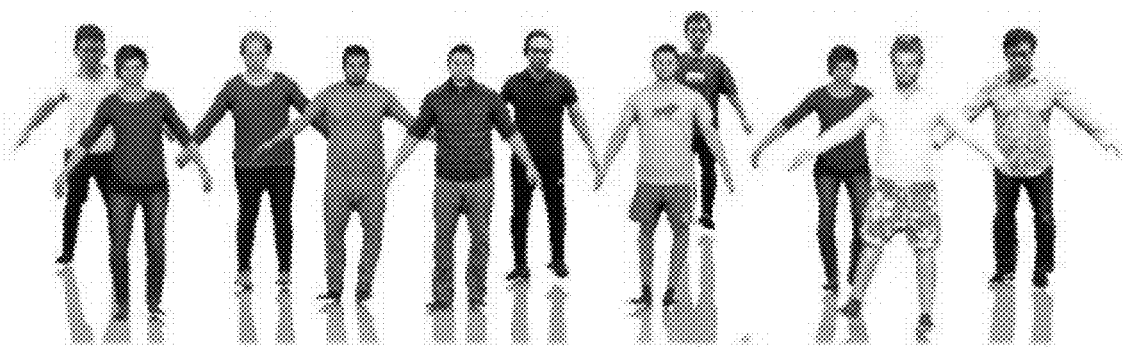
FIG. 6 is a schematic diagram of human body model reconstruction.

Exemplarily, in the present disclosure, a mobile application with a software platform ARCore is further developed to demonstrate application of the model reconstructed by the method for human body model reconstruction in AR. Specifically, in the present disclosure, FIG. 6 is a schematic diagram of human body model reconstruction. As shown in FIG. 6, the reconstruction system reconstructs a 3D human body model according to one frame of image. FIG. 6 shows a reconstruction result acquired based on collected image data and PeopleSnapshot dataset. It can be seen that, a comprehensive experiment is performed on existing image data and the collected image data, the reconstruction system can use action shooting data to manipulate and produce an animation, and the mobile application is developed and the application demonstrates such function in an AR/VR device.

The method for human body model reconstruction is provided by the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

Based on the above described embodiments, in another some embodiments of the present disclosure, when the reconstruction system performs 3D human body construction, the 2-D non-rigid deformation algorithm is provided, and the initial 3D model can be acquired by correcting the initial estimate shape.

Figure 7:
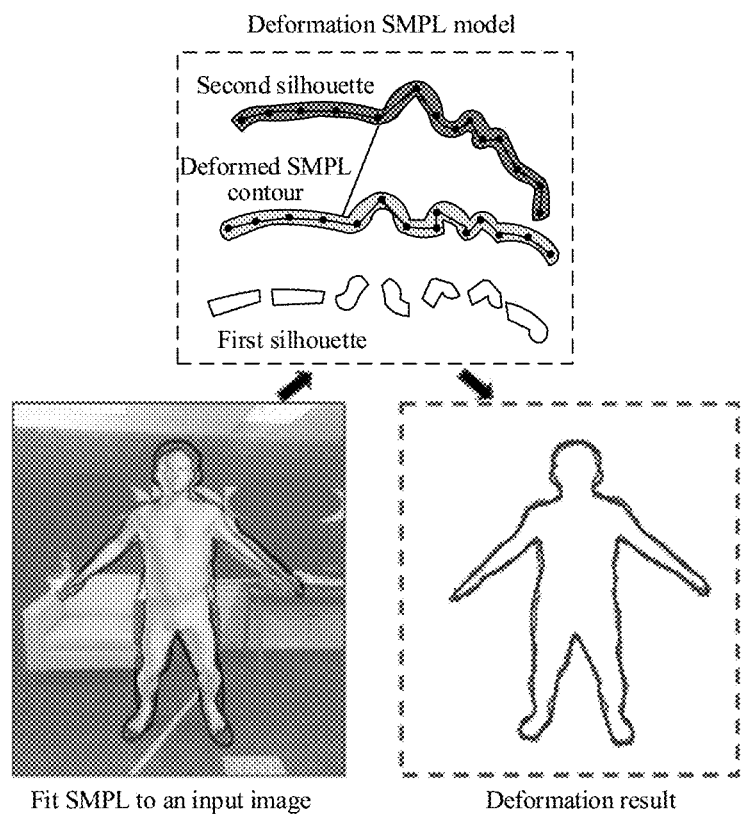
FIG. 7 is a schematic diagram of a 2-D non-rigid registration.

After the human body shape of the object is segmented from the target image and the segmented image is acquired, the reconstruction system can fit the SMPL model to the segmented image. FIG. 7 is a schematic diagram of a 2-D non-rigid registration. As shown in FIG. 7, a goal of the present reconstruction system is to find a correspondence between a SMPL silhouette (black contour) and a segmented human silhouette (white contour), i.e. the first mapping relationship between the first silhouette and the second silhouette. A recovered SMPL mesh, i.e. the initial estimate shape, provides a good initial guess for a reconstructed human body shape of the object. However, a contour of the initial estimate shape and a human body contour of the target image are not the same. Therefore, a method for optimizing human body shape mesh is provided by the embodiments of the present disclosure, and the method optimizes the human body shape mesh by finding a corresponding relationship of an initial SMPL estimate depth map and a depth map of the recovered human body shape.

Specifically, in embodiments of the present disclosure, the reconstruction system can use a 2-D method, instead of a warping in 3D. In the present disclosure, a 2-D non-rigid registration method is adopted to deform the silhouette of the object in the target image, to match with a silhouette of the initial estimate shape. A nearest point from a point of the silhouette of the initial estimate shape to the silhouette of the object is used to guide the deformation, a warping function generated during the registration process can be used to warp a depth map of the SMPL model (i.e. the initial estimate shape) to a final shape, i.e. a corresponding model. In the present disclosure, the reconstruction system can apply a warping function for the front and the back of the object, to acquire a front model and a back model of the object. The two recovered meshes are consistent with silhouettes of the front model and the back model. Thus, the 3D reconstruction model of the object can be acquired by stitching the front model and the back model.

It should be noted that, in embodiments of the present disclosure, in order to adopt the warping function to reconstruct the final shape, in the present disclosure, a human body silhouette (the first silhouette corresponding to the object) is registered to an SMPL silhouette (i.e. the second silhouette of the initial estimate shape).

It can be understood that, given the first silhouette is a set S and the second silhouette is a set T, S has $k_S$ vertices $\{s_i | i=1, \ldots, k_S\}$ and T has $k_T$ vertices $\{t_i | i=1, \ldots, k_T\}$, $s_i$, $t_i \in R^2$. m graph nodes $G=\{g_1, g_2, \ldots, g_m\}$ are sampled uniformly from the set S. Furthermore, in the present disclosure, the reconstruction system can use a deform graph to represent a movement of a process from the first silhouette to the second silhouette. More specifically, in the present disclosure, a goal of the reconstruction system is to solve a set of affine transformation $A=\{A_t\}_{t=1}^m$ and $b=\{b_t\}_{t=1}^m$ to parameterize the deformable movement of the graph nodes. After deformation, the new position of a vertex can be written as the following:

$$s' = f(s, A, b) = \Sigma_{t=1}^m \omega_t(s)[A_t(s-g_t) + g_t + b_t] \tag{1},$$

where $\omega_t(s)$ is the weighing factor of a graph node $g_t$ on the silhouette, and $$\omega_i(s_1) = \max(0, (1 - d(s_1, g_i)^2/R^2)^3) \tag{2},$$

where d $(s_1, g_i)$ is a geodesic distance between point $s_1$ and $g_i$ along the 2D contour line. R is a distance between $s_1$ and its k nearest neighbor graph nodes in geodesic domain. In the present disclosure, k=4.

After the deform graph is constructed, in order to deform the first silhouette S of the human body shape to match the second silhouette T of the SMPL model, in the present disclosure, the reconstruction system can minimize the following energy function to solve for a set of A and b:

$$E_{total}=E_{rigid}\lambda_{rigid}+E_{smooth}\lambda_{smooth}+E_{fit} \quad (3),$$

where $E_{rigid}$ is used to enforce rigidity and property of the rotation matrix and thus is defined as:

$$E_{rigid}=\Sigma_G\|A_i^T A_i - I\|_F^2 + (\det(A_i)-1)^2 \quad (4),$$

where I is an identity matrix.

A second term $E_{smooth}$ enforces spatial smoothness of the geometric deformation and it is defined as:

$$E_{smooth}=\Sigma_G\Sigma_{k\in\Omega(i)}\|A_i(g_k-g_i)+g_i+b_i-(g_k+b_k)\|^2 \quad (5),$$

where $\Omega(i)$ refers to node i's k nearest neighbors.

Furthermore, a data term $E_{fit}$ is similar to a 2-D from of Iterative Closest Point (ICP), which measures the vertex displacements between the source silhouette (first silhouette) and target silhouette (second silhouette) line segments. The data term $E_{fit}$ includes two parts: point to point distances and point-to-plane distances:

$$E_{fit}=\Sigma_{i\in P}\lambda_{point}\|s_i'-t_{s_i}\|^3+\lambda_{plane}|n_i^T(s_i'-t_{s_i})|^2 \quad (6),$$

where $s_i'=f(s_i, a, b)$, $t_{s_i}$ is the closest point of $s_i$ in the second silhouette. $n_i^T n$ is the corresponding normal of $t_{s_i}$. In the present disclosure, $\lambda_{point}=0.1$ and $\lambda_{plane}=1$ are used.

It should be noted that, in embodiments of the present disclosure, after the reconstruction system determines that there is a first mapping relationship M between the first silhouette and the second silhouette, a front mesh can be generated, i.e. the front model of the object is generated. In the present disclosure, for each $s_i$ in $S=\{s_i|i=1, \ldots, k_S\}$ in the initial estimate model, there is a corresponding point on SMPL silhouette boundary $M(S)=\{M(_{S1}), M(_{S2}), \ldots, (S_{kS})\}$.

Furthermore, in the present disclosure, for each pixel p inside a human body mask of the object, its corresponding pixel C(p) is found inside the SMPL mask. In order to compute a dense correspondence, the reconstruction system needs to construct a function that transfers the silhouette correspondence to inside-mask pixel correspondence. Specifically, in the present disclosure, the reconstruction system can use Mean Value Coordinates (MVC) as a warping function. MVC expresses a point inside a planar triangulation as a convex combination of its boundary points. More specifically, the reconstruction system can represent point p using a weighted combination of the first silhouette set S:

$$p=\Sigma_{i=1}^{k}w_i(p)s_i \quad (7).$$

Furthermore, in the present disclosure, after the above described correspondence M and MVC function are computed, $s_i$ can be substituted with $M(s_i)$. Therefore, a first warping function can be represented as:

$$C(p)=\Sigma_{i=1}^{kS}w_i(p)M(s_i) \quad (8).$$

Figure 8:
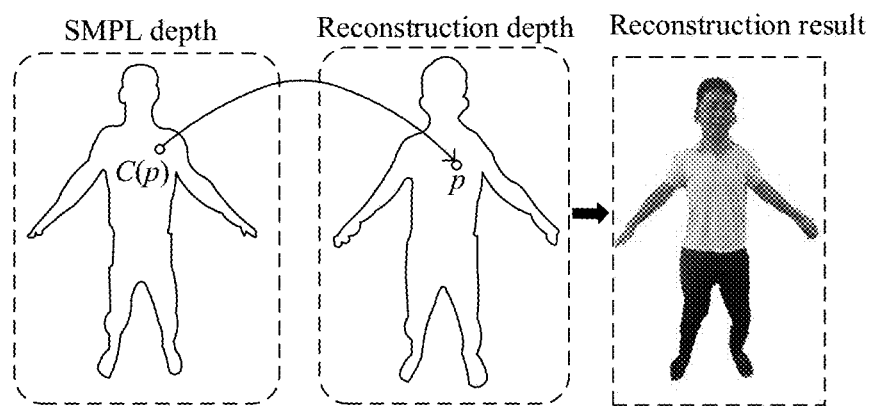
FIG. 8 is a schematic diagram of a model generation method.

Exemplarily, in the present disclosure, FIG. 8 is a schematic diagram of a model generation method. As shown in FIG. 8, for each point p inside human shape mask, the reconstruction system can compute its corresponding point C(p) inside the SMPL mask. The third column in FIG. 8 shows the reconstruction result. As it can be seen, for each pixel p inside human body, the reconstruction system can compute its corresponding pixel C(p) inside the SMPL. That is, the reconstruction system can apply the warping function for the SMPL depth map to complete a depth map of the final front mesh, and thus the front model of the object is generated:

$$Z(p)=Z_{SMPL}(C(p)) \quad (9).$$

It can be understood that, in the present disclosure, after depth of each pixel is acquired, the reconstruction system can build a triangular mesh using geometry constraint. Specifically, the reconstruction result is as shown in the above described FIG. 4.

Figure 9:
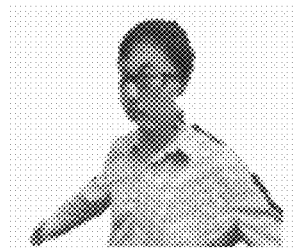
FIG. 9 is a schematic diagram before head correction.
Figure 10:
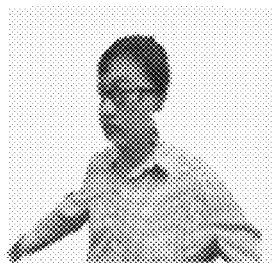
FIG. 10 is a schematic diagram after head correction.

Furthermore, in the present disclosure, FIG. 9 is a schematic diagram before head correction. FIG. 10 is a schematic diagram after head correction. As shown in FIG. 9, after the front model of the object is generated using the first warping function, a deformation may appear on a face of the object. It is especially obvious if a viewpoint is far away from a frontal camera view. Specifically, during the parametric model fitting process, although general parts of body shapes of the object (e.g. torso, upper body, lower body) are reasonable, as shown in FIG. 9, a prediction of a head pose is often inaccurate due to the fact that fitting method does not consider the face feature points during optimization process. A corrected result as shown in FIG. 10, the reconstruction system corrects the misalignment of the face part.

To solve this problem, in the present disclosure, the reconstruction system can fix the face geometry by a two-step approach. Specifically, after the parametric model fitting process, the reconstruction system can first roughly align the head pose. Given image I, face region is detected and subsequently 2-D facial landmark points are detected. The reconstruction system can use 7 fiducial points (corners of two eyes, nose, corners of mouth). Then, a 3D head pose $R_{head}$ is solved by minimizing a reprojection error of 3D fiducial landmark points on the image I:

$$\min\|Proj(R_{head}\cdot x)-x_{2d}\| \quad (10),$$

where Proj is a projection from 3D world coordinate to 2-D camera coordinate, x is a set of 3D landmark points, and $x_{2d}$ are 2-D projections of landmark points on image I.

In conclusion, when the reconstruction system reconstructs the front model of the object, the first silhouette corresponding to the object and the second silhouette of the initial estimate shape can be used to determine the first mapping relationship there between. Then, the corresponding warping function is generated based on the first mapping relationship. Finally, the front model is reconstructed and acquired by the first warping function.

Furthermore, in embodiments of the present disclosure, after the reconstruction system reconstructs a front mesh model, i.e. the front model of the object, the reconstruction system can continue to reconstruct the back model of the object.

Specifically, the reconstruction system can first recover a back estimate shape of the object. Then, a corresponding back model is acquired based on the back estimate shape. Finally, an initial 3D model is acquired based on a stitching process of the front model and the back model.

It can be understood that, in the present disclosure, in order to generate a back estimated model that matches the first silhouette, a virtual camera can be directly set at opposite to a back of a person and a corresponding SMPL model can be rendered. However, a silhouette of the perspectively-projected and rendered back estimate shape may not match the second silhouette of the initial estimate shape. Therefore, in the present disclosure, the reconstruction system can use back-face culling technique.

Specifically, in the present disclosure, the reconstruction system uses the same camera viewpoint as that for rendering the front SMPL model (initial estimate shape). Then, instead of rendering the nearest triangle, the farthest triangle is rendered to acquire a corresponding silhouette image from the back view, i.e. a third silhouette corresponding to the back estimate shape is acquired.

Furthermore, in embodiments of the present disclosure, similar to the method for constructing the front model, after the reconstruction system acquires the third silhouette corresponding to the back estimate shape of the object, the first silhouette and the second silhouette can be used to determine a second mapping relationship between the first silhouette and the third silhouette. Then, a corresponding second warping function is generated based the second mapping relationship. Finally, the second warping function can be used to generate the back model of the object.

Figure 11:
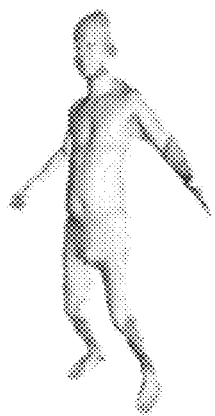
FIG. 11 is a schematic diagram of a front model.
Figure 12:
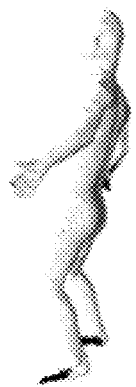
FIG. 12 is a schematic diagram of a back model.
Figure 13:
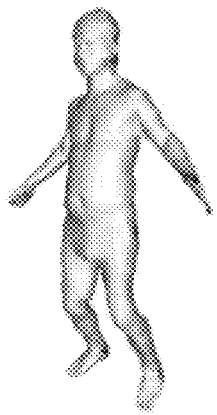
FIG. 13 is a first schematic diagram of a stitched result.
Figure 14:
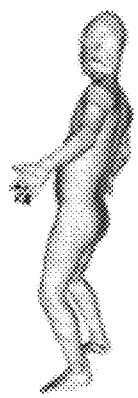
FIG. 14 is a second schematic diagram of a stitched result.

Exemplarily, in embodiments of the present disclosure, FIG. 11 is a schematic diagram of a front model. FIG. 12 is a schematic diagram of a back model. FIG. 13 is a first schematic diagram of a stitched result. FIG. 14 is a second schematic diagram of the stitched result. As shown in FIG. 11, FIG. 12, FIG. 13, and FIG. 14, after the reconstruction system completes the construction of the front model and the back model, the stitching process can be performed on the front model and the back model to acquire the final 3D model. Specifically, the reconstruction system can create geometric triangles that connect the front model and the back model along the boundaries of the front model and the back model, to finally complete the construction of the 3D reconstruction model of the object.

The method for human body model reconstruction is provided by the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

Based on the above embodiments, in yet another some embodiments of the present disclosure, when the reconstruction system performs texture reconstruction, an inference network that can predict an invisible color of an image is provided, i.e. texture generation network. Thus, complete texture information can be predicted and acquired using texture information through the texture generation model.

It should be noted that, in embodiments of the present disclosure, to make the constructed 3D reconstruction model of the object have texture information, a method for projecting an image on a geometry is provided by the present disclosure. Therefore, a terminal needs to acquire the complete texture information of the object, i.e. front texture information and back texture information, where the front texture information is texture information acquired from the segmented image, and the front texture information can be used to predict remaining other texture information of the object.

Furthermore, in the present disclosure, for back texture of the object that is occluded and invisible, a texture generation model is provided by the embodiment of the present disclosure. Thus, the invisible texture of the object can be automatically generated. The texture generation model can be an InferGAN model.

Specifically, according to an input image, the InferGAN can transfer texture from one input RGB image ($I_o$) to another RGB image ($I_t$). An intuitive assumption is that, in latent space, a distance between inputs should be approximately equal to the mathematical distance between the human semantic segmentations $P_o$ and $P_t$ corresponding to images $I_o$ and $I_t$. In the present disclosure, the assumption can be formulated as:

$$\Theta_{img}(I_o) - \Theta_{img}(I_t) \approx \Theta_{seg}(P_o) - \Theta_{seg}(P_t) \qquad (11),$$

$$I_t \approx \Theta^R(\Theta_{img}(I_o) + (\Theta_{seg}(P_o) - \Theta_{seg}(P_t))) \qquad (12),$$

where $\Theta_{img}$ and $\Theta_{seg}$ are image encoder and parsing encoder, respectively. The $\Theta^R$ is an image decoder based on the convoluted latent feature. To save computing resources, in the present disclosure, $\Theta_{img}$ and $\Theta_{seg}$ can be combined together into $\Theta$. Specifically, the InferGAN encodes the texture information from $I_o$ and inpaints new texture pixels into the target body parts ($P_t$) (e.g., back parts during the inference stage).

In a training process of texture generation model, i.e. InferGAN, a training dataset can include multiple sets of texture data. Each set of texture data includes the first texture image and the second texture image captured from the same object at different angles. Exemplarily, a size of the first texture image and the second texture image can be 512×512. In a data preprocessing part, the terminal can first segment the first texture image and the second texture image to acquire segmented $P_o$ from the first texture image and segmented $P_t$ from the second texture image. Exemplarily, human clothing can be defined as 20 parts, thus $P_o$ and $P_t$ can be transferred into one-hot vector map (size of 20×512×512).

Furthermore, in embodiments of the present disclosure, a contour $C_o$ of the human body in the first texture image and a contour $C_t$ of the human body in the second texture image can be further used as inputs when the texture generation model is trained. Specifically, in the present disclosure, a contour (a size of 1×512×512) can make an output of the texture generation network yield sharper boundaries.

It should be noted that, in embodiments of the present disclosure, random affine transformation is performed on the inputted first texture image and the corresponding vector map to increase a diversity of geometry.

In the training process of InferGAN, to save computing resources, in embodiments of the present disclosure, all inputs ($I_o$, $P_o$, $P_t$, $C_o$, and $C_t$) in channel dimension are concatenated, the input size is 45×512×512 after the concatenation. An encoder consists of five convolution blocks learns texture information from $I_o$ and learns geometry information from $P_o$, $C_o$, and $P_t$, $C_t$. Then, a latent feature is passed to 9 residual blocks to further increase an encoding capability. An image decoder consists of five transpose convolutional layers and one hyper-tangent activation function. In the present disclosure, the texture generation network InferGAN can be trained with three loss functions, specifically including, GAN loss, perceptual loss computed on VGG feature extractor (FVGG), and L1 pixel loss. Thus, the total loss L can be expressed as:

$$L = l_{gan} + l_{perceptual} + l_{pixel} \quad (13)$$
$$= E_{I_t, P_t, C_t}[\log D(P_t, C_t, I_t)] +$$
$$E_{I_o, P_o, C_o, P_t, C_t}[\log(1 - D(P_t, C_t, G(I_o, P_o, C_o, P_t, C_t)))] +$$
$$\sum_{n=1}^{5} \frac{1}{2n} \times \|F_{VGG}^n(G(I_o, P_o, C_o, P_t, C_t)) - F_{VGG}^n(I_t)\|_1^1 +$$
$$\|G(I_o, P_o, C_o, P_t, C_t) - I_t\|_1^2$$

where D is discriminator and G is generator. The perceptual loss $l_{perceptual}$ is computed based on the output features of five different layers of VGG19. $F_{VGG}{}^n(I_t)$ is the layer feature of VGG19 on image $I_t$. In the present disclosure, different scales are given to different layer features. Since a loss of GAN is computed in feature space, thus GAN loss and perceptual loss will enforce the network to yield a sharper image.

It should be noted that, in training stage, the first texture image and the second texture image are not constrained, i.e. the first texture image and the second texture image do not need to be constrained as a frontal view image and a rear view image, as long as the first texture image and the second texture image are images containing different texture images.

Furthermore, in embodiments of the present disclosure, the texture generation model InferGAN can be used to predict other texture information (e.g. back texture) of the object other than texture information (front texture). Specifically, in a process of predicting texture information, an inputted target image $I_o$ can be first segmented. A semantic parsing $P_o$ and a contour $C_o$ are determined. Then, semantic parsing and contour $(\hat{P}_t, \hat{C}_t)$ that are invisible in the target image can be estimated. Thus, the remaining other texture information can be acquired, and all information are passed to InferGAN to synthesize the back view texture $\hat{I}_t$.

The method for human body model reconstruction is provided by the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

Based on the above described embodiments, in yet another some embodiments of the present disclosure, in order to demonstrate reliability and effectiveness of the method for human body model reconstruction provided the present disclosure, testing can be performed based on public data and collected data.

Specifically, in the present disclosure, the terminal can use a configured camera to collect images from different objects, to acquire images that can demonstrate the method for human body model reconstruction. A resolution of the image can be 4032×3024. Specifically, to facilitate a subsequent animation reconstruction, a certain pose is used when images are collected in the present disclosure. For example, image acquisition can be performed while the object is in a position with the feet apart and the hands open at 45 degrees.

It can be understood that, in the present disclosure, the reconstruction algorithm can be deployed on a cloud server. For example, reconstruction time is about 1 minute on a PC with CPU Intel Core i7-5820k, 32 GB memory and a Titan X GPU.

Figure 15:
FIG. 15 is a first schematic diagram of a reconstructed human body model.
Figure 16:
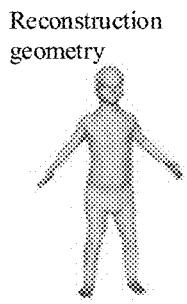
FIG. 16 is a second schematic diagram of a reconstructed human body model.
Figure 17:
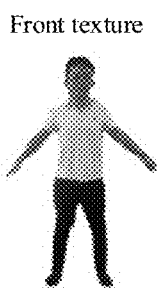
FIG. 17 is a third schematic diagram of a reconstructed human body model.
Figure 18:
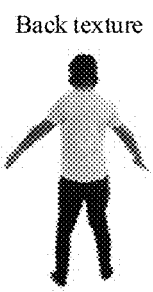
FIG. 18 is a fourth schematic diagram of a reconstructed human body model.

FIG. 15 is a first schematic diagram of a reconstructed human body model. FIG. 16 is a second schematic diagram of the reconstructed human body model. FIG. 17 is a third schematic diagram of the reconstructed human body model. FIG. 18 is a fourth schematic diagram of the reconstructed human body model. As shown in FIG. 15, an inputted target image is shown. As shown in FIG. 16, a reconstructed geometry of human body model is shown. As shown in FIG. 17 and FIG. 18, results observed from different angles using full texture mapping are shown respectively. It can be seen that, the method for human body model reconstruction provided by the present disclosure, can accurately recover the human body shape of the object, and make the reconstructed geometry silhouette be fitted to the input target image very well. Meanwhile, in a condition of having the inputted target image as one frame of image, the invisible texture information can also be predicted and generated.

The method for human body model reconstruction provided by the present disclosure is compared with other human body reconstruction methods on PeopleSnapshot dataset. Specifically, Volumetric inference of 3D human body shapes proposed by Bodynet is a voxel-based method to estimate the pose and shape of the human body. SICLOPE (Silhouette-based clothed people) relies on synthetic masks from different views to reconstruct human shape details. HMR (End-to-end Recovery of Human Shape and Pose) estimates the pose and details of the human body from the SMPL parametric model. A method of Video Shapes uses the same person's 120 images at different angles to merge into a complete human body model. But this method slows down the whole process by optimizing the pose calculated on each frame. In comparison, in the present disclosure, one frame of image is used to reconstruct the human body model and the texture information. Compared to the above described first three methods, the 3D reconstruction model of the object acquired by the present disclosure has more details, and compared to the fourth method that has 120 images as input, the computation loss of the present disclosure is much smaller.

Figure 19:
FIG. 19 is a schematic diagram of an animated reconstruction result.

Furthermore, in embodiments of the present disclosure, in order to make the generated 3D reconstruction model have animation effect, in the present disclosure, the SMPL parametric model can be transferred to the reconstructed model, and captured motion data from CMU dataset can be applied. Exemplarily, FIG. 19 is a schematic diagram of an animated reconstruction result. As shown in FIG. 19, in the present disclosure, jog sequence is applied to the 3D reconstruction model, to generate an animation effect of jogging. It can be seen that, the animation deformation acquired by the present disclosure is reasonable, and animation deformation is good enough for some AR/VR applications.

Furthermore, in embodiments of the present disclosure, the texture generation model InferGAN can be trained and tested on DeepFasion dataset. A learning rate for InferGAN is 0.0002. Adam optimizer is adopted in all experiments ($\beta_1$=0.5, $\beta_2$=0.999). In addition, random cropping, affine transformation, and flipping etc. are used to augment data. The network is trained for 20 epochs. The InferGAN is finally acquired.

In the present disclosure, based on qualitative results of InferGAN on the testing set of DeepFasion dataset, the reconstruction system can infer the target-view image texture by any input-view image texture. For instance, the InferGAN can yield realistic bottom texture based on the whole body source input. Specifically, in the present disclosure, with InferGAN, reasonable upper texture can be synthesized while bottom original texture is kept.

It should be noted that, in the present disclosure, since the goal of the texture generation model is to synthesize missing texture. Therefore, quality of a synthesized face region is not regularized.

Figure 20:
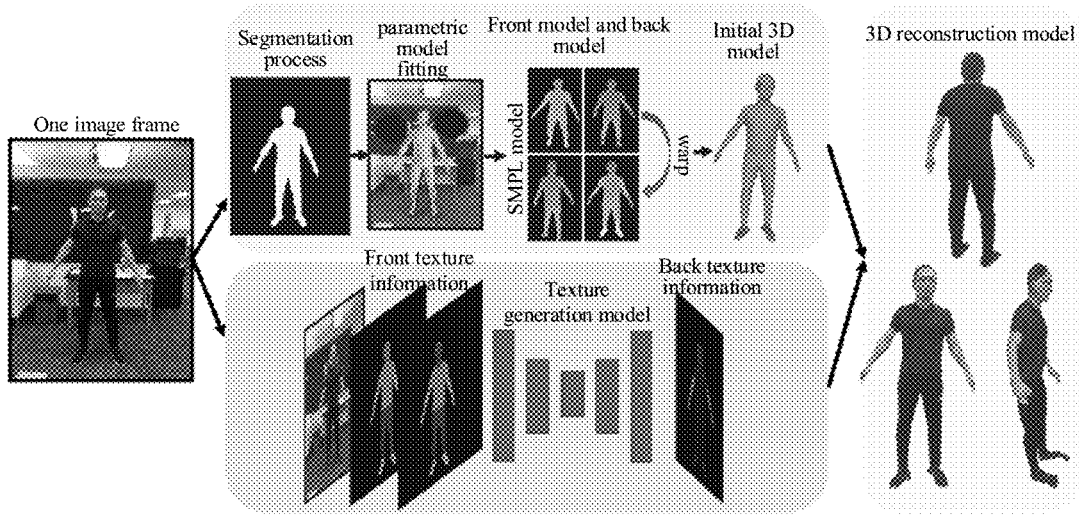
FIG. 20 is a schematic diagram of a system for the human body model reconstruction.

FIG. 20 is a schematic diagram of a system for human body model reconstruction. As shown in FIG. 20, the method for human body model reconstruction provided by the embodiments of the present disclosure, can use one frame of image to reconstruct human body model and texture information. Specifically, in the present disclosure, a 2-D non-rigid registration can be used to deform a geometry from the initial estimate shape to a 3D initial model. In a process of generating other texture information, a pretrained texture generation model can be used. Frontal view texture can be used to infer texture at different angles, and finally complete texture information of the object can be acquired. Furthermore, in the present disclosure, not only a construction of detailed texture and complete geometry structure of a human body can be completed by one frame of image, but also an animation effect can be generated by acquiring an animation model using weights of parametric transfer model.

The method for human body model reconstruction is provided by the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

Figure 21:
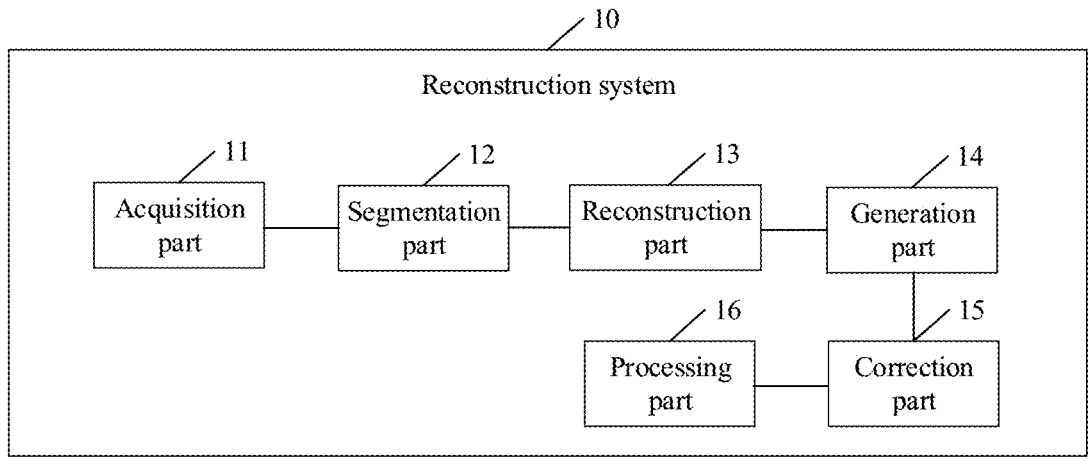
FIG. 21 is a first schematic structural diagram of a reconstruction system.

Based on the above described embodiments. in another some embodiments of the present disclosure, FIG. 21 is a first schematic structural diagram of a reconstruction system. As shown in FIG. 21, the reconstruction system provided by the present disclosure can include an acquisition part 11, a segmentation part 12, a reconstruction part 13, a generation part 14, a correction part 15, and a processing part 16.

The acquisition part 11 is configured to acquire a target image, and the target image is one front image of an object to be reconstructed.

The segmentation part 12 is configured to acquire a segmented image by segmenting the target image based on the object of the target image.

The acquisition part 11 is further configured to acquire an initial estimate shape and a part of texture information of the object respectively, according to the segmented image.

The reconstruction part 13 is configured to determine an initial 3D model of the object through the initial estimate shape, and the initial 3D model is a 3D model without texture.

The acquisition part 11 is further configured to acquire complete texture information of the object according to the part of texture information and a texture generation model.

The generation part 14 is configured to generate a 3D reconstruction model of the object based on the initial 3D model and the complete texture information, and the the 3D reconstruction model is a 3D model with texture.

Furthermore, in embodiments of the present disclosure, the acquisition part 11 is specifically configured to fit the segmented image to an SMPL model, and acquire the initial estimate shape; and extract pixel information of the segmented image, and acquire the texture information.

Furthermore, in embodiments of the present disclosure, the reconstruction part 13 is specifically configured to acquire a first silhouette of the object; correct the initial estimate shape according to the first silhouette, and generate a front model and a back model of the object; and stitching the front model and the back model, and generate the initial 3D model.

Furthermore, in embodiments of the present disclosure, the reconstruction part 13 is further specifically configured to determine a second silhouette of the initial estimate shape; determine a first mapping relationship between the first silhouette and the second silhouette; generate a first warping function based on the first mapping relationship; generate the front model through the first warping function.

Furthermore, in embodiments of the present disclosure, the correction part 15 is configured to, after the front model is generated through the first warping function, fix a face geometry of the front model.

Furthermore, in embodiments of the present disclosure, the reconstruction part 13 is further specifically configured to render the initial estimate shape and acquire a back estimate shape of the object; determine a third silhouette of the back estimate shape; determine a second mapping relationship between the first silhouette and the third silhouette; generate a second warping function based on the second mapping relationship; generate the back model through the second warping function.

Furthermore, in embodiments of the present disclosure, the acquisition part 11 is further configured to, before complete texture information of the object is acquired according to the part of texture information and a texture generation model, acquire a training dataset, and the training dataset includes multiple sets of texture data, and each of the sets of texture data includes a first texture image and a second texture image collected from a same object at different angles.

The generation part 14 is further configured to train the texture generation model through the training dataset.

Furthermore, in embodiments of the present disclosure, the generation part 14 is specifically configured to determine a first contour corresponding to the first texture image, and determine a second contour corresponding to the second texture image; and train the texture generation model through the first texture image, the first contour, the second texture image, and the second contour.

Furthermore, in embodiments of the present disclosure, the acquisition part 11 is further specifically configured to input the part of texture information to the texture generation model, and output predicted texture information, and the predicted texture information is other part of texture information of the object; and acquire the complete texture information based on the part of texture information and the other part of texture information.

Furthermore, in embodiments of the present disclosure, the processing part 16 is configured to, after a 3D reconstruction model of the object is generated based on the initial 3D model and the complete texture information, animates the 3D reconstruction model through an animation reconstruction model.

Furthermore, in embodiments of the present disclosure, the target image is one frame of RGB image.

Figure 22:
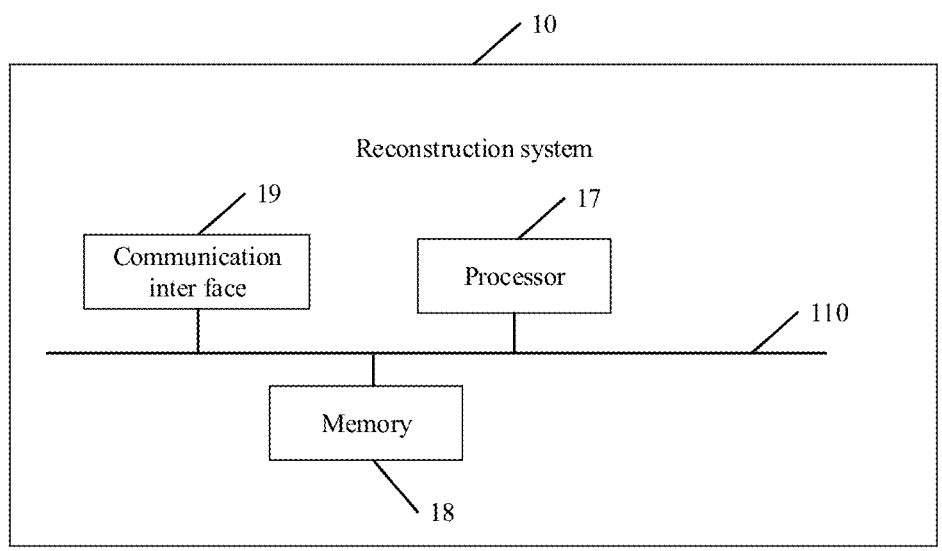
FIG. 22 is a second schematic structural diagram of a reconstruction system.

FIG. 22 is a second schematic structural diagram of the reconstruction system. As shown in FIG. 22, a reconstruction system 10 provided by the embodiment of the present disclosure can further include a processor 17, a memory 18 that stores an instruction that is executable to the processor 17. Furthermore, the reconstruction system 10 can further include a storage communication interface 19, and a bus 110 that is configured to connect the processor 17, the memory 18 and the storage communication interface 19.

In embodiments of the present disclosure, the above described processor 17 can be at least one of ASIC (Application Specific Integrated Circuit), DSP (Digital Signal Processor), DSPD (Digital Signal Processing Device), PLD (Programmable Logic Device), FPGA (Field Programmable Gate Array)), CPU (Central Processing Unit), controller, microcontroller, and microprocessor. It can be understood that, for different devices, the electronic devices used to implement the above processor functions can also be other electronic devices, which will not be limited by the embodiment of the present disclosure. The reconstruction system 10 can further include memory 18, the memory 18 can connect to the processor 17. The memory 18 is configured to store an executable program code, and the program code includes a computer operation instruction. The memory 18 may include a high speed RAM memory, may also include a non-transitory memory, for example, at least two disk memories.

In embodiments of the present disclosure, the bus 110 is configured to connect the storage communication interface 19, the processor 17, and the memory 18; and is configured for communication among these components.

In embodiments of the present disclosure, the memory 18 is configured to store an instruction and data.

Furthermore, in embodiments of the present disclosure, the above described processor 17 is configured to acquire a target image, and acquiring a segmented image by segmenting the target image based on an object to be reconstructed in the target image, the target image being one front image of the object; acquire an initial estimate shape and a part of texture information of the object respectively, according to the segmented image; determine an initial 3D model of the object through the initial estimate shape, the initial 3D model being a 3D model without texture; acquire complete texture information of the object according to the part of texture information and a texture generation model; and generate a 3D reconstruction model of the object based on the initial 3D model and the complete texture information, the 3D reconstruction model being a 3D model with texture.

In an actual application, the above described memory 18 can be a volatile memory, such as a RAM (Random Access Memory); or a non-volatile memory, such as a ROM (Read Only Memory), a flash memory, an HDD (Hard Disk Drive), or an SSD (Solid State Drive); or a combination of the above memories, and instructions and data are provided to the processor 17.

In addition, each functional module in the embodiment can be integrated in a processing unit, or each unit can be physically present individually, or two or more units can be integrated into a single unit. The above integrated units can be realized either in a form of hardware or in a form of software functional modules.

The integrated unit, when implemented as a software function module and not sold or used as a stand-alone product, may be stored in a computer-readable storage medium, based on such understanding, an essence of, or a part that contributes to related technology of, or all or part of the technical solution of the embodiment can be embodied in a form of a software product. The computer software product is stored in a storage medium, and includes several instructions that are used to enable a computer device (can be a personal computer, a server, or a network device etc.), or a processor to perform all or part of the operations of the embodiments. The aforementioned storage medium includes a USB flash drive, a removable hard drive, a ROM, a RAM, a disk or a CD-ROM, and other media that can store a program code.

A reconstruction system is provided by the embodiment of the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

A computer-readable storage medium is provided by the embodiment of the present disclosure, storing a program, and when the program is executed, the above described method for human body model reconstruction is realized.

Specifically, a program instruction of the method for human body model reconstruction of the present embodiment can be stored in a CD-ROM, a hard disk drive, or a USB flash drive or other storage media. When the program instruction of the method for human body model reconstruction in the storage medium is read or executed by an electronic device, the following operations are performed.

A target image is acquired, and a segmented image is acquired by segmenting the target image based on an object to be reconstructed in the target image, and the target image is one front image of the object.

An initial estimate shape and a part of texture information of the object are acquired respectively, according to the segmented image.

An initial 3D model of the object is determined by the initial estimate shape, and the initial 3D model is a 3D model without texture.

Complete texture information of the object is acquired according to the part of texture information and a texture generation model.

A 3D reconstruction model of the object is generated based on the initial 3D model and the complete texture information, and the 3D reconstruction model is a 3D model with texture.

One skilled in the art should understand that embodiments of the present disclosure may be provided as methods, terminals, or computer program products. Therefore, the present disclosure may take a form of a hardware embodiment, a software embodiment, or an embodiment combining software and hardware aspects. Further, the present disclosure may take a form of a computer program product implemented on one or more computer-usable storage media (including, but not limited to, disk memory and optical memory, etc.) that contain computer-usable program code therein.

The present disclosure is described with reference to schematic flow diagrams and/or block diagrams of implementations, devices (systems), computer program products, and methods according to embodiments of the present disclosure. It should be understood that each process and/or block in the schematic flow diagrams and/or block diagrams, and the combination of the processes and/or blocks in the schematic flow diagrams and/or block diagrams may be implemented by computer program instructions. These computer program instructions may be provided to a processor of a general purpose computer, a specialized computer, an embedded processor, or other programmable data processing devices to produce a machine; such that the instructions executed by the processor of the computer or other programmable data processing devices, produce a device for implementing the functions specified in implementing one process or more processes in the schematic flow diagrams and/or one block or more blocks in the block diagram.

The computer program instructions may also be stored in a computer-readable memory capable of directing a computer or other programmable data processing devices to operate in a particular manner, such that the instructions stored in the computer-readable memory produce a manufactured good that includes an instruction device. The instruction device performs functions specified in one process or more processes of the implementation of schematic flow diagrams and/or one block or more blocks of the block diagrams.

The computer program instructions may also be loaded onto a computer or other programmable data processing devices such that a series of operational steps are performed on the computer or other programmable devices to produce computer-implemented processing. Thereby, the instructions executed on the computer or other programmable devices provide operations for implementing the functions specified in one or more processes of the implementation of the schematic flow diagram and/or one or more blocks of the block diagrams.

The above descriptions are only better embodiments of the present disclosure, and is not intended to limit the scope of protection of the present disclosure.

INDUSTRIAL APPLICABILITY

A method, a reconstruction system, and a storage medium for human body model reconstruction are provided by the embodiment of the present disclosure. The reconstruction system acquires a target image, and acquires a segmented image by performing segmentation based on an object to be reconstructed of the target image, the target image is one front image of the object; acquires an initial estimate shape and texture information of the object respectively, according to the segmented image; determines an initial 3D model of the object through the initial estimate shape, the initial 3D model being a 3D model without texture; acquires complete texture information of the object according to the texture information and a texture generation model; and generates a 3D reconstruction model of the object based on the initial 3D model and the complete texture information, the 3D reconstruction model being a 3D model with texture. It can be seen that, in embodiments of the present disclosure, after the reconstruction system acquires the target image, the segmented image corresponding to the object is acquired by the segmentation process. Based on the segmented image, on one hand, the reconstruction system can acquire the initial estimate shape and generate an initial 3D model corresponding to the object and without human body texture. On the other hand, the reconstruction system can extract a part of texture information from the segmented image, recover complete texture information of the object using a texture generation model, and finally acquire a 3D reconstruction model with texture through mapping between the initial 3D reconstruction model and the complete texture information. It can be seen that, the method provided by the present disclosure can adopt one frame of image to accurately reconstruct a 3D model of a human body. Meanwhile, complete texture information of the human body can be recovered. Thus, an accuracy of model reconstruction is improved and an effect of model reconstruction is greatly optimized.

What is claimed is:

1. A method for human body model reconstruction, comprising:
   acquiring a target image, and acquiring a segmented image by segmenting the target image based on an object to be reconstructed in the target image, the target image being one front image of the object;
   acquiring an initial estimate shape and a part of texture information of the object, according to the segmented image;
   determining an initial 3D model of the object through the initial estimate shape, the initial 3D model being a 3D model without texture;
   acquiring complete texture information of the object according to the part of texture information and a texture generation model; and
   generating a 3D reconstruction model of the object based on the initial 3D model and the complete texture information, the 3D reconstruction model being a 3D model with texture,
   wherein the determining an initial 3D model of the object through the initial estimate shape comprises:
      acquiring a first silhouette of the object;
      correcting the initial estimate shape according to the first silhouette, and generating a front model and a back model of the object; and
      stitching the front model and the back model, and generating the initial 3D model,
   wherein the correcting the initial estimate shape according to the first silhouette, and generating a back model of the object comprises:
      rendering the initial estimate shape and acquiring a back estimate shape of the object;
      determining a third silhouette of the back estimate shape;
      determining a second mapping relationship between the first silhouette and the third silhouette; and
      generating the back model based on the second mapping relationship.

2. The method as claimed in claim 1, wherein the acquiring an initial estimate shape and a part of texture information of the object respectively, according to the segmented image comprises:
   fitting the segmented image to a SMPL model, and acquiring the initial estimate shape; and
   extracting pixel information of the segmented image, and acquiring the part of texture information.

3. The method as claimed in claim 1, wherein the determining the third silhouette of the back estimate shape comprises:
using a same camera viewpoint as that for the initial estimate shape, rendering the farthest triangle from the camera viewpoint and acquiring a corresponding silhouette image as the third silhouette.

4. The method as claimed in claim 1, wherein the correcting the initial estimate shape according to the first silhouette, and generating a front model of the object comprises:
   determining a second silhouette of the initial estimate shape;
   determining a first mapping relationship between the first silhouette and the second silhouette;
   generating a first warping function based on the first mapping relationship; and
   generating the front model through the first warping function.

5. The method as claimed in claim 4, after the generating the front model through the first warping function, further comprising:
   fixing a face geometry of the front model.

6. The method as claimed in claim 1, wherein the generating the back model based on the second mapping relationship comprises:
   generating a second warping function based on the second mapping relationship; and
   generating the back model through the second warping function.

7. The method as claimed in claim 1, before acquiring complete texture information of the object according to the part of texture information and a texture generation model, further comprising:
   acquiring a training dataset, the training dataset comprising a plurality of sets of texture data, and each of the sets of texture data comprising a first texture image and a second texture image collected from a same object at different angles; and
   training the texture generation model through the training dataset.

8. The method as claimed in claim 7, wherein the training the texture generation model through the training dataset comprises:
   determining a first contour corresponding to the first texture image, and determining a second contour corresponding to the second texture image; and
   training the texture generation model through the first texture image, the first contour, the second texture image, and the second contour.

9. The method as claimed in claim 7, wherein the acquiring complete texture information of the object according to the part of texture information and a texture generation model comprises:
   inputting the part of texture information to the texture generation model and outputting other part of texture information of the object; and
   acquiring the complete texture information based on the part of texture information and the other part of texture information.

10. The method as claimed in claim 1, after the generating a 3D reconstruction model of the object based on the initial 3D model and the complete texture information, further comprising:
    animating the 3D reconstruction model through an animation reconstruction model.

11. The method as claimed in claim 1, wherein the target image is one frame of an RGB image.

12. A reconstruction system, wherein the reconstruction system comprises a processor and a memory storing instructions executable by the processor, and when the instructions are executed by the processor, causing the processor to perform:

acquiring one front image of an object to be reconstructed and acquiring a segmented image by segmenting the one front image based on the object in the one front image;

acquiring an initial estimate shape and front texture information of the object respectively, according to the segmented image;

determining an initial 3D model of the object through the initial estimate shape, the initial 3D model being a 3D model without texture;

acquiring complete texture information of the object according to the front texture information and a texture generation model; and generating a 3D reconstruction model of the object based on the initial 3D model and the complete texture information, the 3D reconstruction model being a 3D model with texture, wherein the determining an initial 3D model of the object through the initial estimate shape comprises:

acquiring a first silhouette of the object;

correcting the initial estimate shape according to the first silhouette, and generating a front model and a back model of the object; and stitching the front model and the back model, and generating the initial 3D model, wherein the correcting the initial estimate shape according to the first silhouette, and generating a back model of the object comprises:

rendering the initial estimate shape and acquiring a back estimate shape of the object;

determining a third silhouette of the back estimate shape;

determining a second mapping relationship between the first silhouette and the third silhouette; and generating the back model based on the second mapping relationship.

13. The reconstruction system as claimed in claim 12, wherein the initial estimate shape is acquired by fitting the segmented image to a SMPL model; and the front texture information is acquired by extracting pixel information of the segmented image.

14. The reconstruction system as claimed in claim 12, wherein the determining the third silhouette of the back estimate shape comprises:

using a same camera viewpoint as that for the initial estimate shape, rendering the farthest triangle from the camera viewpoint and acquiring a corresponding silhouette image as the third silhouette.

15. The reconstruction system as claimed in claim 12, wherein the correcting the initial estimate shape according to the first silhouette, and generating a front model of the object comprises:

determining a second silhouette of the initial estimate shape;

determining a first mapping relationship between the first silhouette and the second silhouette;

generating a first warping function based on the first mapping relationship; and generating the front model through the first warping function.

16. The reconstruction system as claimed in claim 12, wherein the generating the back model based on the second mapping relationship comprises:

generating a second warping function based on the second mapping relationship; and generating the back model through the second warping function.

17. The reconstruction system as claimed in claim 12, wherein the texture generation model is trained through a training dataset, the training dataset comprising a plurality of sets of texture data, and each of the sets of texture data comprising a first texture image and a second texture image collected from a same object at different angles.

18. The reconstruction system as claimed in claim 17, wherein the texture generation model is trained through the first texture image, a first contour corresponding to the first texture image, the second texture image, and a second contour corresponding to the second texture image the training dataset.

19. The reconstruction system as claimed in claim 17, wherein the complete texture information of the object comprises the front texture information and back texture information, the back texture information is predicted from the front texture information through the texture generation model.

20. A non-transitory computer-readable storage medium, wherein the computer-readable storage medium stores a program, when the program is executed, causing a processor to perform:

acquiring one front image of an object to be reconstructed and acquiring a segmented image by segmenting the one front image based on the object in the one front image;

acquiring an initial estimate shape and front texture information of the object respectively, according to the segmented image;

determining an initial 3D model of the object through the initial estimate shape, the initial 3D model being a 3D model without texture;

acquiring complete texture information of the object according to the front texture information and a texture generation model; and generating a 3D reconstruction model of the object based on the initial 3D model and the complete texture information, the 3D reconstruction model being a 3D model with texture, wherein the determining an initial 3D model of the object through the initial estimate shape comprises:

acquiring a first silhouette of the object;

correcting the initial estimate shape according to the first silhouette, and generating a front model and a back model of the object; and stitching the front model and the back model, and generating the initial 3D model, wherein the correcting the initial estimate shape according to the first silhouette, and generating a back model of the object comprises:

rendering the initial estimate shape and acquiring a back estimate shape of the object;

determining a third silhouette of the back estimate shape;

determining a second mapping relationship between the first silhouette and the third silhouette; and generating the back model based on the second mapping relationship.

\* \* \* \* \*